United States Patent [19]
Kim

[11] Patent Number: 5,513,163
[45] Date of Patent: Apr. 30, 1996

[54] OPTICAL TAPE RECORDING/REPRODUCING APPARATUS

[75] Inventor: Keum-Mo Kim, Seoul, Rep. of Korea

[73] Assignee: Daewoo Electronics Co., Ltd., Seoul, Rep. of Korea

[21] Appl. No.: 294,451

[22] Filed: Aug. 23, 1994

[30] Foreign Application Priority Data

Aug. 24, 1993 [KR] Rep. of Korea .................. 93-16472

[51] Int. Cl.$^6$ ........................................ G11B 7/00
[52] U.S. Cl. ................................. 369/97; 369/44.18
[58] Field of Search .......................... 369/44.17, 44.18, 369/97, 110, 111, 125, 44.24; 360/10.2, 10.3, 77.13

[56] References Cited

U.S. PATENT DOCUMENTS 4,321,700  3/1982  Russell ............................ 369/97

Primary Examiner—Nabil Z. Hindi
Attorney, Agent, or Firm—Anderson Kill Olick & Oshinsky

[57] ABSTRACT

An optical tape reading/recording apparatus comprises a transparent hollow drum and a pinch roller for guiding a running optical tape, the optical tape retained between the drum and the pinch roller and a scanning device for scanning the optical tape closely contacted on a spherical lateral surface of the hollow drum.

4 Claims, 3 Drawing Sheets

OPTICAL TAPE RECORDING/REPRODUCING APPARATUS

FIELD OF THE INVENTION

The present invention is directed to an optical tape recording/reproducing apparatus adapted to read/record information from/on an optical tape; and, more particularly, to an improved apparatus which dispenses with a head switching device and is capable of accurately scanning information tracks on an optical tape through the use of a spherical drum and a pinch roller.

DESCRIPTION OF THE PRIOR ART

Because of the ability to pack large volumes of information in high density and owing to the durability and integrity of the recorded information, the optical tape recording/reproducing apparatus employing a laser beam is gaining an increasing level of industry interest and attention. The optical tape recording/reproducing apparatus utilizes an optical tape as the medium to record information thereon, which is a plastic tape overlaid with a reflective material.

One of such prior art optical tape recording/reproducing apparatus is disclosed in U.S. Pat. No. 4,669,070 issued to Alen E. Bell, which comprises a rotatable support, an optical tape fed along an arc, adjacent said rotatable support and first and second focussing means attached to the support. However, this apparatus requires an extra switching device between the first and the second focussing means, which renders the entire structure rather complicated and expensive to construct.

SUMMARY OF THE INVENTION

It is, therefore, a primary object of the invention to provide an optical tape recording/reproducing apparatus capable of performing its assigned tasks without using the extra switching device.

Another object of the invention is to provide an optical tape recording/reproducing apparatus capable of preserving a constant distance between an optical tape and a scanning device therein, thereby permitting a highly precise reading.

The above and other objects of the invention are accomplished by providing an optical tape recording/reproducing apparatus provided with a pair of take-up and supply reel pulleys connected to a driving mechanism for running an optical tape, guide means mounted on a deck for determining a running path of the tape and pickup means for recording information on the optical tape or reading information off the tape through the use of a laser beam, wherein said guide means comprises:

a transparent hollow drum having a spherical lateral surface, said drum horizontally rotatably mounted on the deck, and a pinch roller having a concave lateral surface with a radius equal or greater than that of the spherical surface, said pinch roller horizontally rotatably mounted on the deck, adjacent the hollow drum, for maintaining a close contact between the optical tape and the spherical surface of the hollow drum; and said pickup means comprises:

a laser source, a scanning device having four beam outlets arranged at a right angle with each other on a vertical plane which passes through the center of the pinch roller and the center of the hollow drum, said scanning device further having a plurality of beam splitters and mirrors for dividing a laser beam emitted from the laser source into four laser beams and outputting the four laser beams through the four beam outlets, said scanning device adapted to rotate about an axis perpendicular to the vertical plane for permitting the outputted laser beams to, one by one, scan the optical tape in close contact with the drum in a manner to vertically and pivotally pass over the surface of the tape, and a black body adapted to absorb the outputted laser beams except the beam scanning said optical tape.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
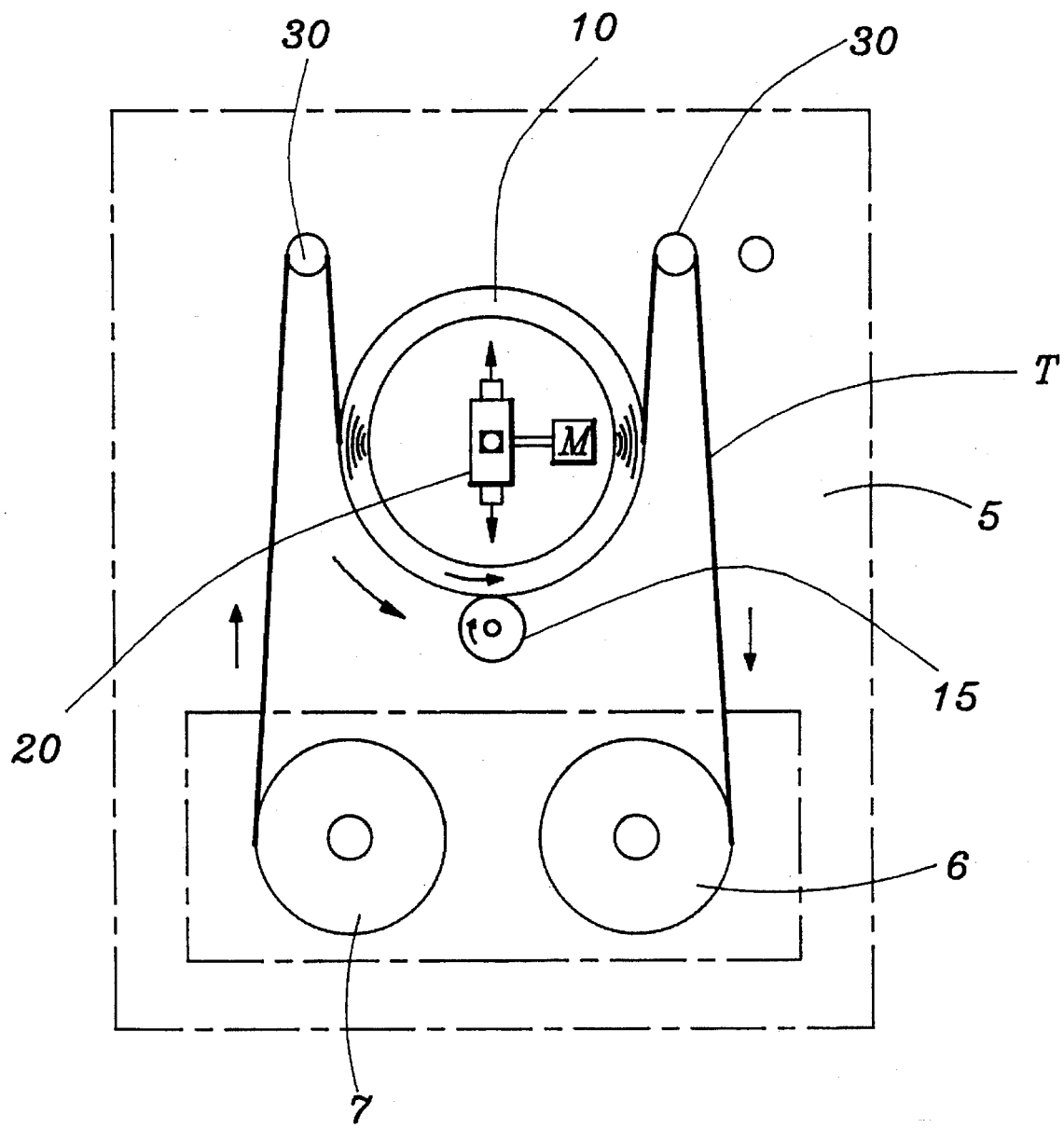
FIG. 1 shows a schematic top view of an optical tape recording/reproducing apparatus in accordance with the present invention.

Referring to FIG. 1, there is shown a deck chassis 5 of an optical tape recording/reproducing apparatus in accordance with the present invention. On one side, the deck chassis 5 is provided with a pair of take-up 6 and supply reel pulleys 7 connected to a tape drive mechanism(not shown), which collectively constitute a reel table providing a place for an optical tape cassette. The other side of the deck 5 has a group of guiding structures, determining the running path of an optical tape T, which include a hollow drum 10, a pinch roller 15 and a pair of guide members 30.

On the other hand, the optical tape T runs from the supply reel toward the take-up reel within the cassette through the guide members 30 and between the hollow drum 10 and the pinch roller 15, in the direction indicated with arrows.

Figure 2:
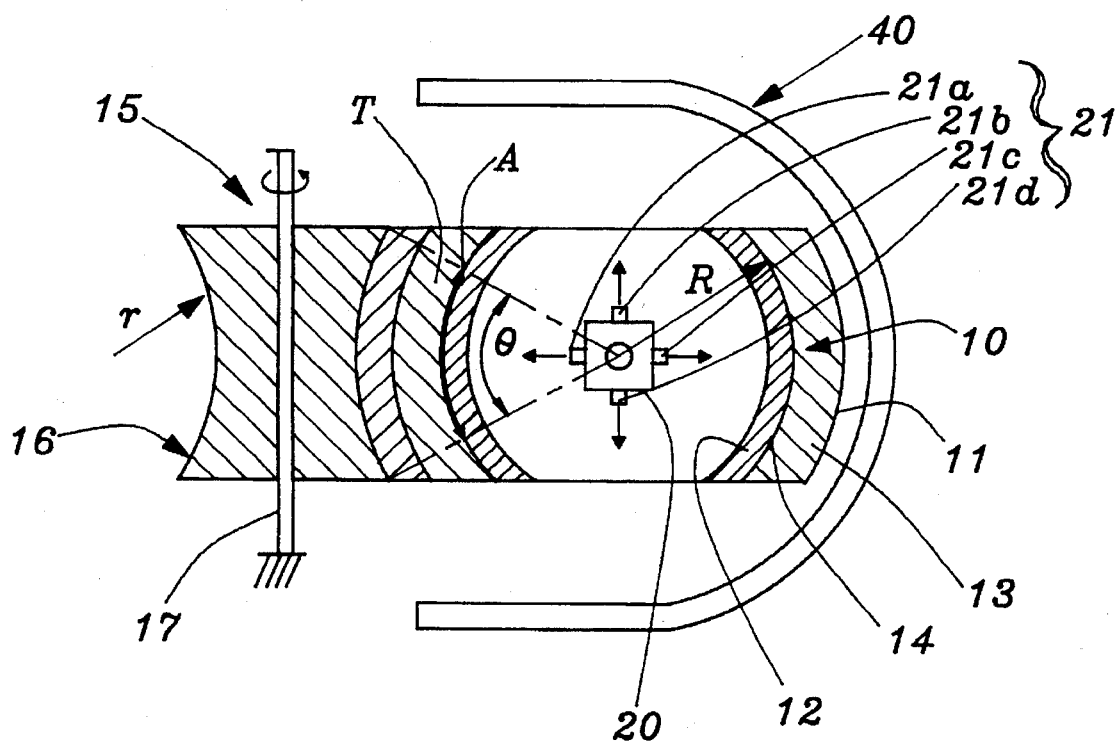
FIG. 2 schematically illustrates a longitudinal sectional view of a hollow drum and a pinch roller in accordance with the present invention.

In FIG. 2, the hollow drum 10 and the pinch roller 15 are illustrated in a longitudinal sectional view. The hollow drum 10, having a transparent spherical lateral portion 13 whose upside and downside appear to be cut away, is mounted rotatably on a horizontal plane with respect to the deck 5. A lateral inner surface 14 of the hollow drum 10 is coated with an anti-reflection material 12, e.g., quartz, for preventing the reflection of a laser beam impinging on the inner surface 14, while a lateral external surface 11 of the hollow drum 10 guides the optical tape T in a manner to be rotated by a frictional force of the running optical tape T.

The pinch roller 15 is mounted on the deck 5, adjacent the hollow drum 10, to help a close engagement of the optical tape T with the hollow drum 10. A concave lateral surface of the pinch roller 15 together with the lateral external surface 11 of the drum 10 comes into rolling contact with the optical tape T as the pinch roller 15 is pivoted by the frictional force of the tape. However, in order to prevent a damage to the optical tape T by too tight an engagement between the drum 10 and the pinch roller 15, it is preferable that the radius r of the lateral concave 16 be equal or slightly greater than the radius R of the hollow drum 10.

Located inside the hollow drum 10 is a scanning device 20 which is mounted rotatably on a plane perpendicular to the deck 5, connected to a driving motor M as shown in FIG. 1. The scanning device 20 has first, second, third and fourth beam outlets 21a, 21b, 21c and 21d arranged at a right angle with each other on the vertical plane, through which four laser beams are concurrently outputted in the respective directions indicated with arrows.

Figure 3:
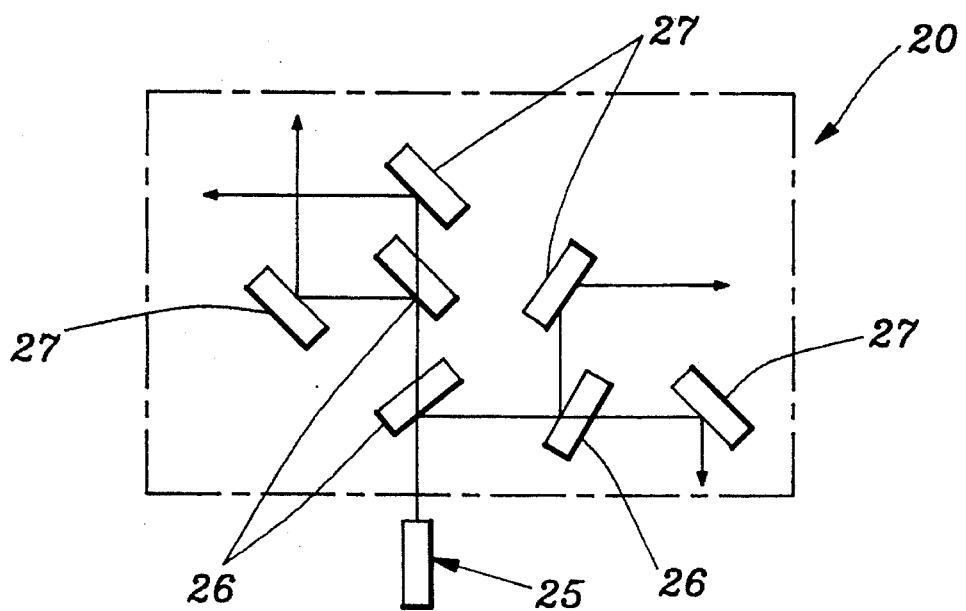
FIG. 3 offers a scheme of a laser beam path within a scanning device of the present invention.

Further, the scanning device 20 has a plurality of beam splitters 26 and mirrors 27, as shown in FIG. 3, which are arranged to divide a laser beam emitted from a laser 25, for example, GaAs laser, HeNe laser, etc., into the four laser beams and direct the four beams to the outlets 21a, 21b, 21c and 21d, respectively.

On the other hand, a black body 40 for absorbing the laser beams out of the scanning device 20 is mounted to vertically surround the hollow drum 10. The black body 40 absorbs the idle beams which are not interacting with the optical tape T, of the four beams leaving the scanning device 20.

The operation of the inventive optical tape apparatus will be now described in reference to FIGS. 2 and 3.

The optical tape T horizontally running is subjected to scanning by the four laser beams outputted from the scanning device 20 which rotates on the vertical plane, as the tape T passes between the hollow drum 10 and the pinch roller 15. The four laser beams, outputted from the four beam outlets 21 oriented at a right angle each other on the scanning device 20, impinge on the surface of the optical tape T through the spherical lateral portion 13 in such a way that the first outlet 21a pivotally passes over the first information track on the optical tape T, from the upper side of the track toward the lower side thereof and then the second outlet 21b scans the second track in a same way. During the reading mode of the apparatus, in order to prevent an unwanted reflection of the laser beams which are not scanning the information track on the tape T, the black body 40 is mounted to cover an angular range at above 270° of the vertical plane.

In accordance with the above configuration, while the laser beam outputted through the first beam outlet 21a scans the first track of the optical tape T, the remaining beams are absorbed; and, simarly, when the laser beam from the second 21b begins to scan the second track, the first, third and fourth outlet beams 21a, c and d, are absorbed into the black body 40.

Accordingly, the scanning device 20 in accordance with the present invention is capable of sequentially scanning the optical tape T without having to use an extra switching means, for example, means for selectively blocking the beam outlets 21 for permitting only one beam scanning the optical tape to be outputted, etc.

On the other hand, it should be apparent that angle Θ, at which arc A defines the width of the optical tape T on the spherical lateral surface 11, should be equal to or smaller than 90°; otherwise, the optical tape T would be subjected to a multiple number of scans by a number of laser beams at the same time.

Figure 4:
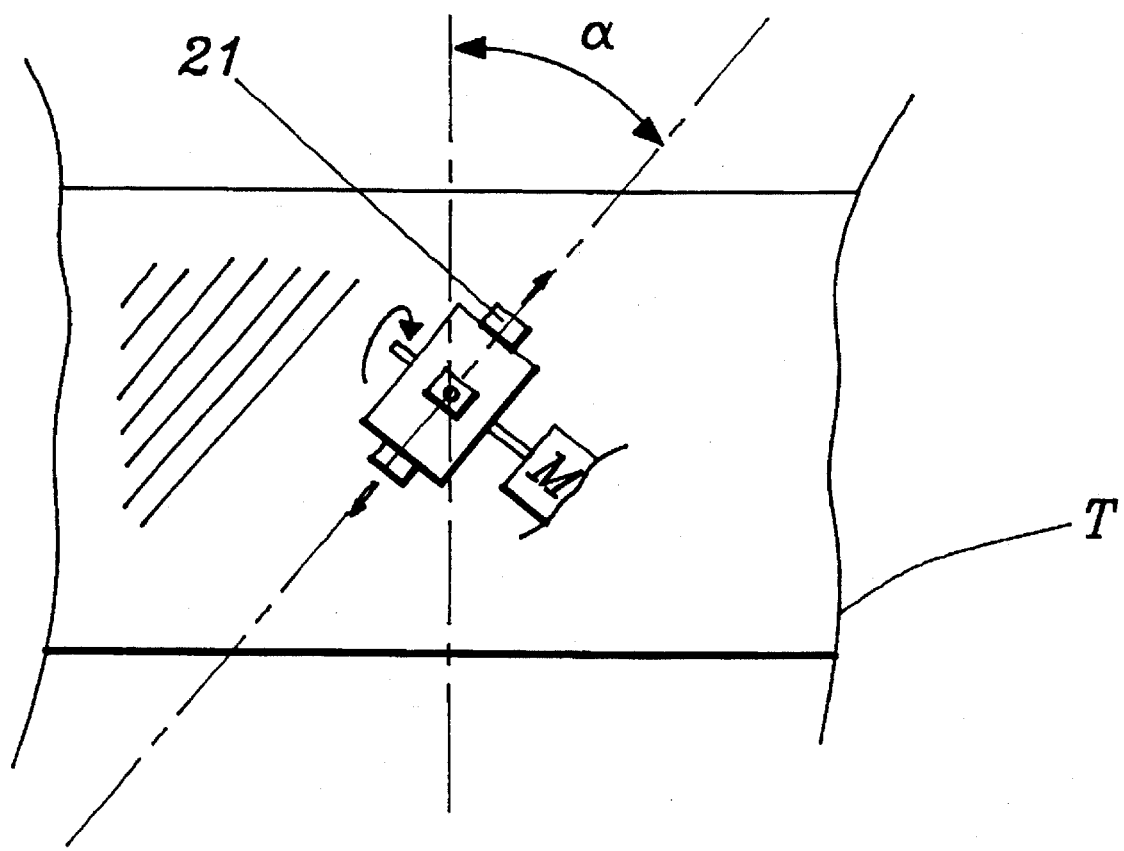
FIG. 4 presents an alternative embodiment of the scanning device of the present invention.

FIG. 4 shows a further embodiment of the scanning device 20 of the present invention, wherein said scanning device 20 is mounted at a predetermined slanted angle with respect to the deck 5 in order to scan a helically fashioned signal on the optical tape T, which means that the information track of the optical tape T runs at a slanted angle with respect to the feeding direction of the tape T.

Although the invention has been shown and described with respect to the preferred embodiments, it will be understood by those skilled in the art that various changes and modifications may be made without departing from the spirit and scope of the invention as defined in the following claims.

What is claimed is:

1. An optical tape recording/reproducing apparatus provided with a pair of take-up and supply reel pulleys connected to a driving mechanism for running an optical tape, guide means mounted on a deck for determining a running path of the tape and pickup means for recording information on the optical tape or reading information off the tape through the use of a laser beam, wherein said guide means comprises:

a transparent hollow drum having a spherical lateral surface, said drum horizontally and rotatably mounted on the deck, and a pinch roller having a concave lateral surface with a radius equal or greater than that of the spherical surface, said pinch roller horizontally and rotatably mounted on the deck, adjacent the hollow drum, for maintaining a close contact between the optical tape and the spherical surface of the hollow drum; and said pickup means comprises:

a laser source, a scanning device having four beam outlets arranged at a right angle with each other on a vertical plane which passes through the center of the pinch roller and the center of the hollow drum, said scanning device further having a plurality of beam splitters and mirrors for dividing a laser beam emitted from the laser source into four laser beams and outputting the four laser beams through the four beam outlets, said scanning device adapted to rotate about an axis perpendicular to the vertical plane for permitting the outputted laser beams to, one by one, scan the optical tape in close contact with the drum in a manner to vertically and pivotally pass over the surface of the tape, and a black body adapted to absorb the outputted laser beams except the beam scanning the optical tape.

2. The optical tape recording/reproducing apparatus as recited in claim 1, wherein said optical tape has a width equal to an arc covering an angular range of up to 90° with respect to the rotational direction of the scanning device.

3. The optical tape recording/reproducing apparatus as recited in claim 1, wherein said hollow drum comprises an anti-reflection material layer coated on its inner surface.

4. The optical tape recording/reproducing apparatus as recited in claim 1, wherein said scanning device is mounted at a predetermined slanted angle with respect to the deck in order to scan a helically recorded signal on the optical tape.

* * * * *